US010226775B2

(12) United States Patent
Bai et al.

(10) Patent No.: US 10,226,775 B2
(45) Date of Patent: Mar. 12, 2019

(54) APPARATUS FOR REMOVING PARTICULATE MATTER FROM LIQUIDS

(71) Applicant: LaBaer, San Diego, CA (US)

(72) Inventors: Ying Bai, San Diego, CA (US); Hui Vicki Tan, San Diego, CA (US); Xu Chen, San Diego, CA (US); Ao Chen, San Diego, CA (US)

( * ) Notice: Subject to any disclaimer, the term of this patent is extended or adjusted under 35 U.S.C. 154(b) by 175 days.

(21) Appl. No.: 15/334,229

(22) Filed: Oct. 25, 2016

(65) Prior Publication Data

US 2018/0111130 A1   Apr. 26, 2018

(51) Int. Cl.
| | | |
|---|---|---|
| B03C 5/02 | (2006.01) | |
| B03C 5/00 | (2006.01) | |
| B03C 7/02 | (2006.01) | |
| C02F 1/469 | (2006.01) | |

(52) U.S. Cl.
CPC .............. B03C 5/005 (2013.01); B03C 5/022 (2013.01); B03C 5/024 (2013.01); B03C 5/026 (2013.01); B03C 7/023 (2013.01); C02F 1/469 (2013.01); C02F 1/4696 (2013.01)

(58) Field of Classification Search
CPC ..... C02F 1/4691–1/4698; B03C 5/005–5/028; B03C 7/00; B03C 7/02; B03C 7/023; B03C 7/026; B03C 2210/02; B03C 2210/08; B03C 2201/02; B03C 2201/08
See application file for complete search history.

(56) References Cited

U.S. PATENT DOCUMENTS

| | | | | | |
|---|---|---|---|---|---|
| 3,928,158 | A | * | 12/1975 | Fritsche | B01D 35/06 204/562 |
| 4,200,509 | A | * | 4/1980 | Seguine | B01D 35/06 204/572 |
| 5,587,057 | A | * | 12/1996 | Metzler | B01D 17/06 204/228.6 |

OTHER PUBLICATIONS

Abidin et al., "Factors Affecting Dielectrophoretic Separation of Cells Using High-Gradient Electric Field Strength System," Journal of Engineering Science and Technology vol. 3 No. 1 (2008) 30-39 (Year: 2008).*
G. Ray Fritsche, "Electrostatic separator removes FCC catalyst fines from decanted oil," The Oil and Gas Journal Mar. 28, 1977, pp. 73-81 (Year: 1977).*

* cited by examiner

*Primary Examiner* — Alexander S Noguerola
(74) *Attorney, Agent, or Firm* — MU P.C.

(57) ABSTRACT

A dielectrophoretic separator has a separator vessel having a fluid ingress at a first side and a fluid egress at a second side, an electrode electrically connected to a power source and contained within the vessel, along the central axis, a plurality of high permittivity dielectric rods within the vessel positioned around and parallel to the electrode, wherein the electrode has a first polarity and the vessel has a second polarity such that an electromagnetic field is generated between the electrode and the vessel. A method of performing a separation cycle has the steps of: i) powering up an electrode within a vessel such that the electrode and vessel have an opposite polarity, wherein a plurality of high permittivity dielectric rods are contained within the vessel, ii)

(Continued)

the fluid passing through channels between the rods, iii) the solid particles within the fluid being retained against the rods by electrical field(s).

19 Claims, 5 Drawing Sheets

APPARATUS FOR REMOVING PARTICULATE MATTER FROM LIQUIDS

BACKGROUND OF THE INVENTION

1. Field of Invention

The present invention relates to the field of separation of particulate matter from liquids, in particular dielectrophoretic separation from liquids having high electrical resistivity such as oil.

2. Description of Related Art

In the industrial world, the separations of impurities in the form of solid from a mixture of such impurities and carrying liquid are of great importance for various purposes. Conventionally, five most commonly used categories of solid-liquid separation methods in such applications have been gravity sedimentation, mechanical filtration separation, centrifugal separation, electrostatic separation, and chemical-assisted separation. The effectiveness of any separation method is closely related to the size of solid particles that are being separated and the physical and chemical properties of the liquid-solid mixture from which they are being separated. The effectiveness of solid-liquid separation directly impacts the cost of manufacturing and environment, so the choice of a suitable separation method is normally based on considerations of technological feasibility, cost and benefit evaluation, and environmental impact.

Crude oil has played a significant role in today's world, and its processed products like gasoline, diesel are vital for today's industrial world and people's life. The quality of the crude oil refining products, like the particulates and vanadium compounds in jet fuel, is also crucial for the healthy operation and lifetime of jet engines.

Furthermore, burning fuels with contaminants will cause server environmental pollution. In developed countries like US and Britain, fuel oils are required to meet the approval standards with regards to solid contaminants concentrations, i.e. 120 ppm. Therefore, there is a need for effective yet low operation cost technology to meet this application need. It is an objective of the invention to enhance the particle removal efficiency required by the oil refinery industry.

One of the most challenging applications is to remove spent catalyst particles from the heavy cycle oil and slurry oil by-product of Fluid Catalyst Cracking (FCC), which is widely used to convert the high-boiling, high-molecular weight hydrocarbon fractions of petroleum crude oils to smaller chains comprising more valuable gasoline, olefinic gases, and other products. The feedstock to an FCC is usual that portion of the crude oil that has an initial boiling point of 340° C. or higher at atmospheric pressure and an average molecular weight ranging from about 200 to 600 or higher. The FCC process vaporizes and breaks the long-chain molecules of the high-boiling hydrocarbon oils into much shorter molecules by contacting the feedstock, at high temperature and moderate pressure, with a fluidized powdered catalyst.

The catalyst is a solid sand-like material that is made fluid by the hot vapor and oil fed into the FCC. In general, the spent catalyst particles' sizes range from 0.5~80 micrometer, with majority of them under 10 microns. The most common kind of FCC catalyst is a solid sand-like fine powder with a bulk density of 0.80 to 0.96 g/cm3 that is made fluid by the hot vapor and oil fed into the FCC. The fresh FCC catalyst fines normally have a particle size distribution ranging from 10 to 150 μm and an average particle size of 50 to 100 μm. The design and operation of an FCC unit is largely dependent upon the chemical and physical properties of the catalyst. By contacting the fluidized catalyst powders, the majority of the long-chain FCC hydrocarbon feedstock breaks the long-chain molecules into much shorter molecules, while a small percentage portion (2%-9%) of the long-chain hydrocarbon feedstock oil, called FCC slurry oil or decant oil, will be unbreakable and reside at the bottom of the FCC processing fractionator. The FCC residual oil or slurry oil contains a high concentration of FCC catalyst ranging from 1000 ppm to 10,000 ppm.

The spent catalyst particles, while useful for "cracking" and reducing the length of the hydrocarbons, are harmful for the processes that transform slurry oil into raw material for more value added applications. Traditionally, the slurry oil containing the catalysts is pumped through a slurry settler, wherein, after settling, the bottom oil contains most of the catalyst particles and is recycled into the feedstock, or in clarified form, for use as heavy fuel oil. Failure to remove the spent catalyst particles often results in the slurry oil being used as a lesser grade heavy fuel for cargo fleets, which in addition to being less efficient, aggregate air pollution.

Particles with diameter smaller than 20 microns take a long time, usually in the range of days, to sediment, which makes the gravity sedimentation method impractical for refineries to adopt in a mass-production environment. Mechanical filtration is ineffective for such small-sized particles because the metal mesh and powder sintered filters have poor uniformity of pore size, and the particle concentration in the filtered slurry oil still in the range of hundreds of ppm. Electrostatic separation methods that have been adopted in the industry, however, have demonstrated high particle removal efficiency. Drawbacks of electrostatic separation include a high operating cost, a process that is highly selective in terms of slurry oil feedstock's physical properties, and an unstable performance. Moreover, electrostatic separation is ineffective when the particle concentration in the slurry oil is over 6000 ppm.

Centrifugal separation can yield good particle removal efficiency unselective to physical properties of slurry oil, but the slurry oil needs to be pre-heated to over 200° C. resulting in a high operation cost, a long processing cycle and low processing capacity. Since a high rotational energy is needed for the entire liquid media to separate 0.5% or 5000 ppm, the energy efficiency is low and only practical for high value materials like nuclear reactor fuel. For a typical refinery having 100 kilotons/year in slurry oil, the centrifugal separation is highly cost-prohibitive and impractical due to a high temperature requirement.

Most mechanical filters will accumulate a filtration cake to achieve the filtration efficiency for the micro-particles under 10 μm in size. As a result, mechanical filters are quickly clogged up during normal operation, and need to be cleaned or backwashed regularly once the pressure drop reaches a limit. In practice it is very difficult to completely clean the plugged micrometer holes. The clogged residual particles will build up in or around the opening, and the pressure drop through filter will increase, limiting the filtration capacity. Once a clogged filter can no longer be cleaned, it must be replaced. Most of refineries with highly viscous slurry oil have found that this method is cost-prohibitive due to the need to regularly replace metal filtration cores.

Starting in 1970s, a new type of filter was developed, called "Electrofilter" or "Electrostatic Separator", which featured a glass bead bed or porous filtration media under high electric fields from the high voltage (up to 50 kVDC) electrodes. Several types of electrofilters were invented and developed to remove metal compound solids or catalyst fines from the heavy oil for last two decades. Electrofilter technology advanced to fluidize the glass bead bed, which consisted of spherical smooth surfaces, to overcome the cleaning difficulties experienced during the mechanical filter operation. This cleaning process is more effective when the electric field is turned off. Even though there are few scientific references or theoretical studies directly focused on the electrofilter's electrostatic separation mechanisms, the electrofilter achieved some degree of success in refineries.

In the past, dielectrophoretic separation was applied in biophysics or biomedical fields for cell separation. The name Dielectrophoresis "DEP" was first adopted by Pohl in 1950s for the unique electromechanics of particles suspended in a fluid medium when exposed to an applied electric field gradient. In a uniform electric field, the field-induced force on charge-neutral dielectric particles is zero or infinitesimal small. Once the applied electric field is non-uniform or has a gradient, the difference in dielectric polarization between the particles and the fluid medium result a net force on the polarized particles, called "dieletrophoretic forces" (DEP forces). The DEP formula can be derived and quantified in terms of the effective electromagnetic dipole forces on the polarized particles induced by the applied electrostatic field. For the simple case of a spherical particle of radius R and permittivity $\varepsilon_p$ immersed in a lossless dielectric fluid of permittivity $\varepsilon_m$ and subject a non-uniform electric field E:

$$F_{DEP} = 2\pi R^3 \varepsilon_m \kappa (\nabla E^2), \quad (1)$$

Where k is $(\varepsilon_p - \varepsilon_m)/(\varepsilon_p + 2\varepsilon_m)$, the real part of Clasius-Mossotti factor, that represents the effective polarizability of the particle with respect to the liquid medium. The $(\nabla E^2)$ quantifies the electric field strength and gradient. Equation (1) indicates that DEP force is proportional to the volume or size of the particle, and the strength and gradient of the applied electric field E. Accordingly, DEP filtration systems can be designed and improved by designing the effective gradient and strength region for the applied electric field.

However, there have been problems applying DEP principles to resolve the industrial solid-liquid separation or filtration issues, particularly the spent catalyst removal issue from FCC slurry oil. In a high-pressure and high-temperature operating environment, refining processes commonly adopt cylindrical vessels as the reactor chambers. A gradient electric field between the center and the side of the vessel, through which a fluid passes, is normally induced by an isolated central high voltage electrode. Under a 3000V high voltage central-electrode 5 cm-cylindrical electrostatic field, a 5 μm particle with a density 2 g/cm$^3$ in the oil, will experience a DEP force of about $2\times10^{-13}$ N, which is about 25 times weaker than the gravitational force due to the particle's weight $5\times10^{-12}$ N. It is impractical to apply more than 50 k VDC to a 5 cm cylinder in industrial applications. Today, there remain few industrial DEP applications, and one example is solid-liquid separations. So far, DEP is mostly employed in trapping or separating particles, such as blood cells and cancer cells, in biological or biomedical applications, where a DEP force 10 times stronger than a gravitational settling force can be created by applying micro-electromechanical structural electrodes under normal 10 s VDC or VAC.

In last decade, thousands of technical publications and hundreds of patents were created on the microscopic DEP biomedical applications, such as cell separation and trapping. In order to apply DEP into the industrial applications, such as removing tons of catalyst fines from thousands of tons of the refining process oil streams, like slurry oil, the stronger DEP forces on the particulates must be created to achieve practical efficiency and processing capacities. Therefore there is a need for a device and process to produce these stronger DEP forces in a consistent manner to facilitate solid-liquid separation in oil applications.

SUMMARY OF THE INVENTION

As shown in Equation 1, once the permittivity $\varepsilon_p$ of the particle is significantly different from the permittivity of the medium $\varepsilon_m$, dielectrophoretic force will be induced and created the separation motion between the particles and the medium. Depending on the dielectric properties of the particles relative to the suspending medium, Dielectrophoretic forces can be either positive or negative, inducing the particles to move to areas of stronger or weaker electric fields. The magnitudes of dielectrophoretic forces are proportional to both the applied electric field and the resulting electric field gradient. By certain arrangement of electrodes that induce non-uniform electric field, greater DEP forces region could be created to maximize the separation motion and collection.

In general, in a first aspect, the invention features a solid-liquid separation apparatus, including a chamber that normally is a cylindrical vessel and has at least one inlet and one outlet while the chamber shell serves as the ground electrode, an electrically connected high voltage electrode preferably located at the center of the cylinder, wherein the cylindrical vessel is chosen as the chamber, and insulation blocks for the high voltage electrode to feedthrough the shielding chamber shell. The apparatus also includes a pair of insulation disks with even distributed through holes that allow the liquid from the inlet to flow through the separation electrical field evenly. The diameters of the vessel, central rods, and metal rods are selected mathematically to allow the densely packing rods to minimize the void space and maximize the relative gradient of field within those spaces. The empty space among the dense packed rods and the wall of chamber or vessel create small or miniature channels for liquid to flow through. Once the central electrode is energized by high voltage DC or AC, the particles in the liquid experience the significant DEP forces that induce a separation motion perpendicular to the flow direction. The particles with the separation movement would be trapped or collected in the joints among the metal rods and the vessel wall.

The invention provides a DEP separator, which creates DEP separation forces on the particles in the flow-through liquid, includes a central electrode tightly surrounded by layers of the insulated metal rods and a cylindrical shell that encompasses the insulated metal rods and provides the ground reference and shields. The central electrode and the insulated metal rods are required to be assembled with dense packing methods, in an embodiment hexagonal packing. Depending on the ratio of electrode width to rod width, the packing orientation may vary to pentagonal, heptagonal, octagonal or otherwise. The dense packing of the rods create small through-channels therebetween that allow the liquid medium to flow through. By providing the layers of the insulated metal rod array surrounding the central electrode, the conductive metal rods change the applied electric field to many local gradient electric fields that are perpendicular to the central electrode or the fluid flow direction.

Since the metal rods have infinite permittivity and are highly polarized in the cylindrical electric field, the densely packed metal rods create both the maximum and minimum electric field magnitude at the contact points in a section view or lines in a volume view. Since the maximum and minimum field points are closely located to each other due to the dense packing, a maximum electric field gradient will be created among the contact points or lines in each localized regions. Due to the directional cylindrical electric field characteristics, the induced electric field gradients are perpendicular to the rods or the flow channels. Maximum gradient electric fields among the insulated metal rods create the maximum DEP forces on the particles in the liquid through the channels. While the liquid coming from the inlet flows through the channels created by the dense packing rods, the particles in liquid flow experience either positive or negative DEP forces that are perpendicular to the channels. In turn, the particles in the liquid flow will experience a separation movement perpendicular to the flow direction, separating the particles from the fluid. The application of highly permissive, or metal, materials plus the dense packing of the rods in the invention are key measures to maximize DEP forces.

In general, the invention features a DEP separator that consists of the densely packed, high permittivity (metal) rods around a central metal electrode rod encompassed by a cylindrical metal shell. All geometric shapes of the rod can be applied for the invention to achieve the particle separation effect. Considering the manufacturability and lifetime of the insulation layer on the surfaces of the metal rods, the cylindrical or circular shape for the rod are preferred and selected. Given the cylindrical shell as the boundary, several diameter sizes of the cylindrical rods can be selected to achieve more dense packing to maximize DEP forces and separation efficiencies. It is advantageous to pack rods of uniform diameter for the hexagonal dense packing of the core layers, wherein the last outer layer between the hexagonal packing core and the inner surface of the cylindrical vessel be packed with rods of a different radius to maximize the rod surface area.

In some embodiments, according to the sizes of the particles and the liquid characteristics (e.g. viscosity and permittivity) of the liquid, smaller insulated metal rods are needed and selected to maximize the separation efficiencies and capacities. Mathematically with a well-defined cylindrical shell, an optimal geometrical packing and spacing among the rods result in the optimal DEP separation performance on the separation efficiencies and flow capacities. In the present embodiments, both 6.35 mm and 3.18 mm metal rods are used to construct the DEP separator.

The apparatus can include an inlet manifold disk through which fluid can be distributed to the packed rods and DEP separation channels. The apparatus also includes an outlet manifold disk through which fluid can be removed from the coiled substrate. The inlet and outlet manifold are made of insulation materials, such like PTFE, that provide the needed electrical isolation for the insulated rods from the end lids of the cylindrical chamber. The opening locations of the inlet and outlet manifold disks are designed according to the opening location of the packing insulated rod channels. The alignment of the opening between the disks and the channels are needed for effectively cleaning the trapped particles in the channels with the wash fluids. The time interval needed for cleaning the particles channels can be estimated by the particle collection volume of the total channels, the incoming particle concentration in the liquid, separation efficiency, and the liquid flow rate. During operation, the cleaning time interval can be also actively controlled the specified pressure drop threshold between the inlet and the outlet. The cleaning can also be performed by the high pressurized air. During the cleaning process, especially for air cleaning process, DEP separator is electrically disconnected, or the central high voltage electrode is disconnected. Without DEP forces that trap the particles, the collected particles can be easily cleaned, which has significant advantages over the troublesome mechanical filter cleaning.

In another aspect, the invention features a filtration system for filtering fine particulates from the liquid comprising the DEP separation apparatus of the foregoing aspects and supply reservoirs, wherein the supply reservoirs are respectively configured to supply and collect liquid from DEP separator. The system can include a pre-filter configured to filter liquid from the reservoir prior to the liquid being supplied to the apparatus. The pre-filter can substantially prevent certain particles in the liquid from entering the apparatus. The certain particles can be larger than a threshold particle size (e.g., the threshold particle size can have a maximum dimension equal or bigger than the width of the channels that formed by the adjacent rods).

In general, in another aspect, the invention features a system for filtering a fluid, including a supply reservoir, arrays of the insulated metal or high permittivity rods that densely fill the space between a central electrode and a vessel shell electrode, a collection reservoir, and a high voltage DC power supply up to 10 kV. During operation of the system, the supply reservoir supplies the fluid to the channels that formed by the dense-packed adjacent rods and the collection reservoir collects fluid exiting from the channels, and the high voltage power applies a needed voltage potential on the central electrode to create the gradient electric field.

In an embodiment, a dielectrophoretic separator has a separator vessel having a fluid ingress at a first side and a fluid egress at a second side, an electrode electrically connected to a power source and contained within the vessel, along the central axis, a plurality of high permittivity dielectric rods within the vessel positioned around and parallel to the electrode, wherein the electrode has a first polarity and the vessel has a second polarity such that an electromagnetic field is generated between the electrode and the vessel.

The dielectrophoretic separator may have a cylindrical vessel with the ingress and egress at opposite ends. The insulated metal or high permittivity dielectric rods may have an electrical connection to the power source.

The dielectrophoretic separator's insulated metal rods are anodized aluminum rods in an embodiment, or may be coated with the insulation materials, selected from the group consisting of PTFE plastic and ceramic.

The high permittivity dielectric rods are positioned around the electrode, and may form a concentric pattern around the electrode configured to minimize the hollow space among rods, in particular a hexagonal shape pattern.

The dielectrophoretic separator may have an inlet manifold disk between the fluid ingress and the rods, and an outlet manifold disk between the rods and the fluid egress, and the inlet manifold disk and outlet manifold disk may be made from a material selected from the group consisting of ceramic and PTFE.

The dielectrophoretic separator may also have a pre-filter on the fluid ingress to filter particles before fluid enters the vessel.

The plurality of high permittivity dielectric rods are electrodes and produce an electromagnetic field.

A method of performing a separation cycle has the steps of: i) powering up an electrode within a vessel such that the electrode and vessel have an opposite polarity, wherein a plurality of high permittivity dielectric rods are contained within the vessel, ii) the fluid passing through channels between the rods, iii) the solid particles within the fluid being retained against the rods by electrical field(s).

The particles may be retained against points of contact between the rods.

The insulated metal or high permittivity dielectric rods may be electrically connected to the power source and generate an electromagnetic field.

The insulated metal rods may be anodized aluminum rods, or may be coated with insulation materials selected from the group consisting of PTFE plastic and ceramic.

The method may have the additional steps of i) powering down the electrode within the vessel to cease generation of the electromagnetic field, ii) a cleaning fluid entering the vessel, and iii) the cleaning fluid passing through the channels and pushing the particles out of the channels, wherein the particles are no longer retained against the rods.

In an embodiment, the cleaning fluid enters the vessel from the egress end and exits from the ingress end. The method may have the additional step of pushing pressurized gas through the vessel to push out the cleaning fluid.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
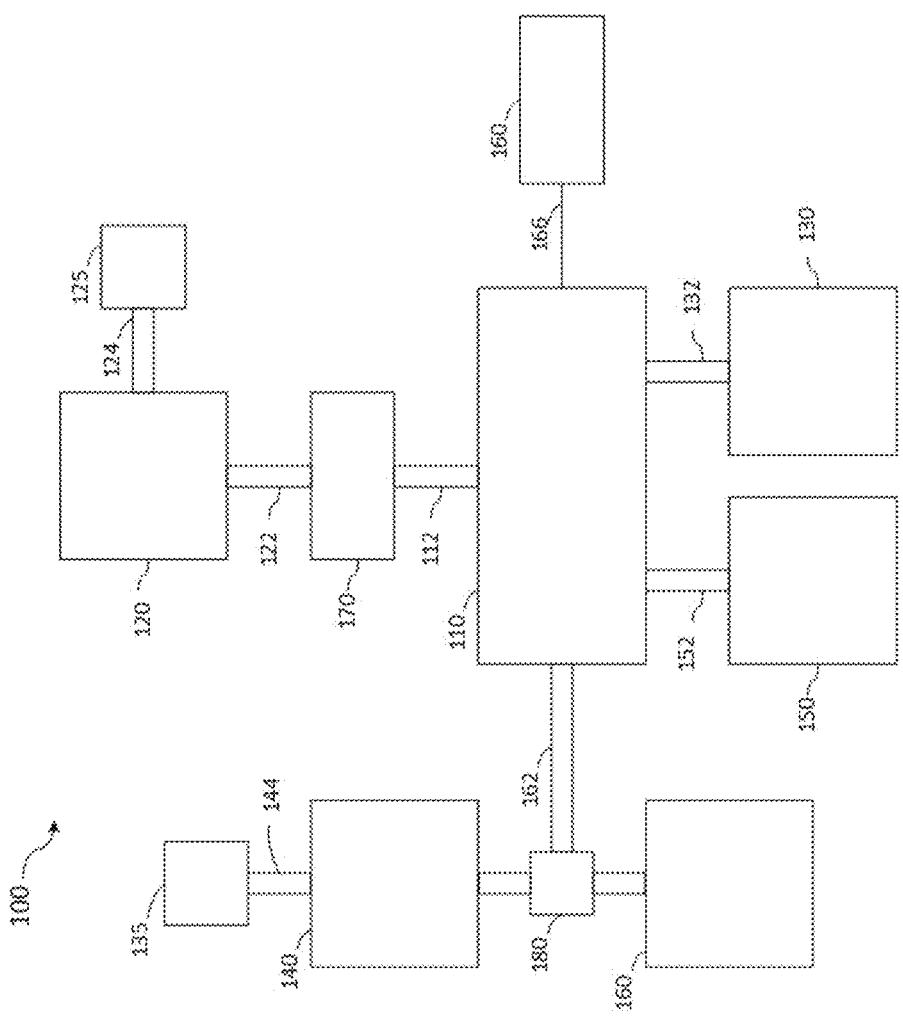
FIG. 1 is a diagram of a dielectrophoresis ("DEP") filtration system; according to an embodiment of the present invention.
Figure 2A:
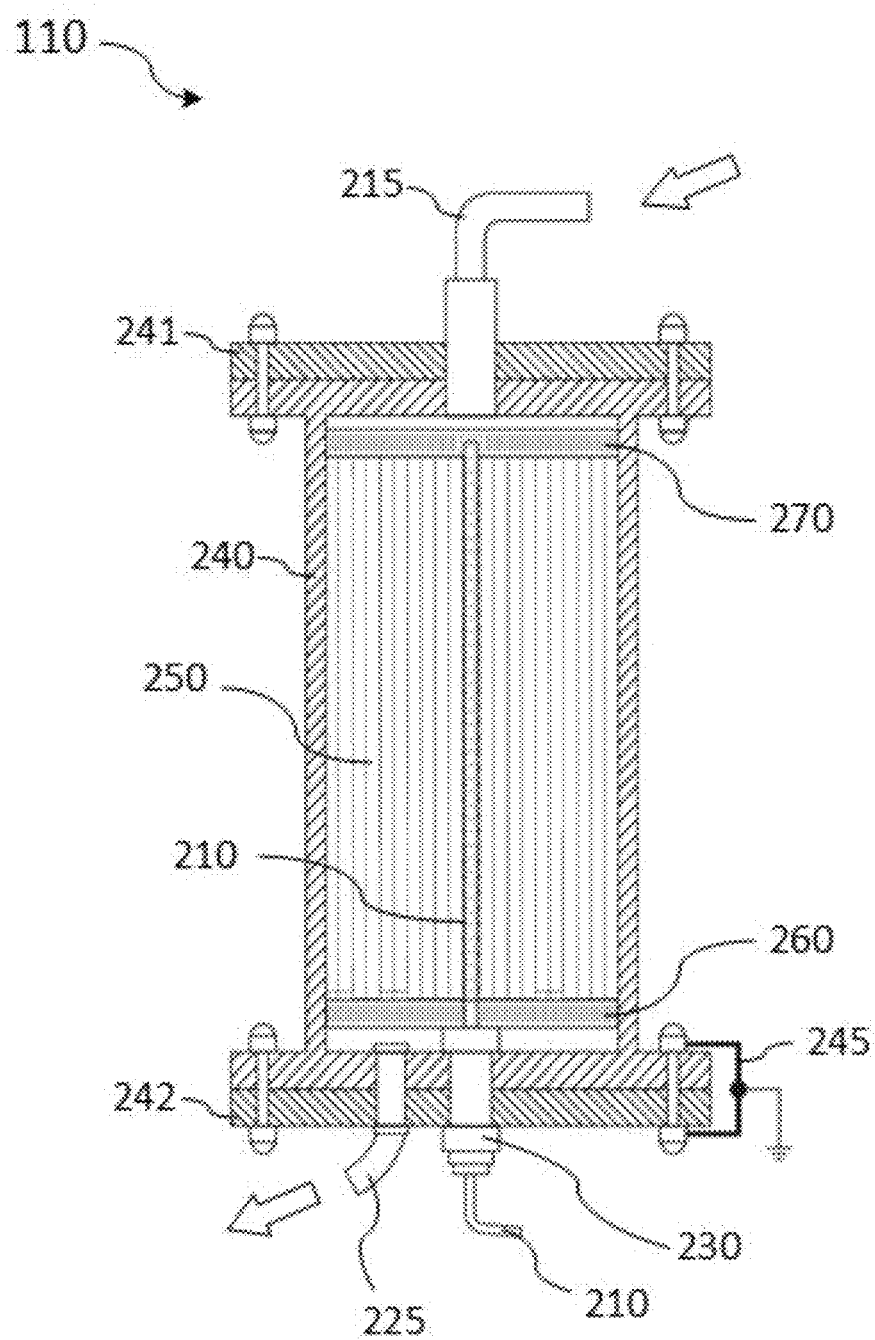
FIG. 2A is a schematic diagram of a DEP separator according to an embodiment of the present invention.
Figure 2B:
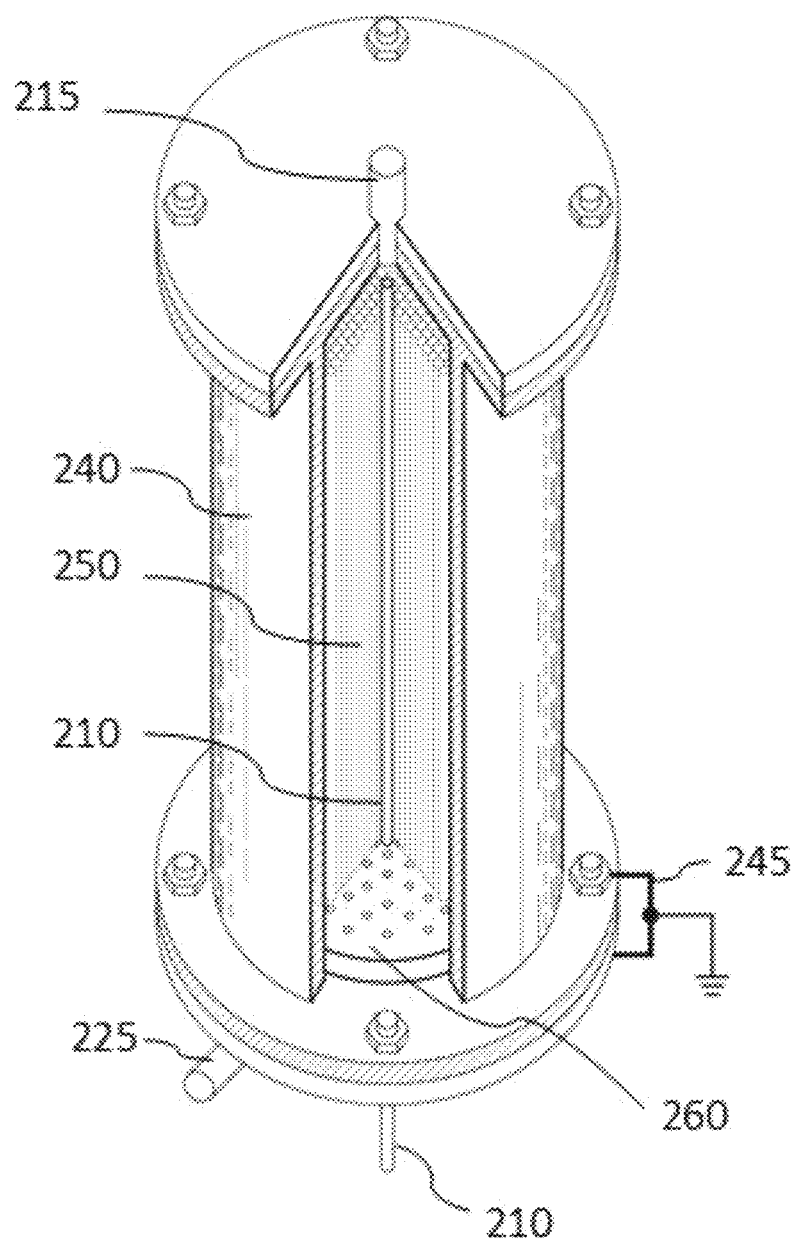
FIG. 2B is an isometric cut-away view of the separator, according to an embodiment of the present invention according to an embodiment of the present invention.
Figure 2C:
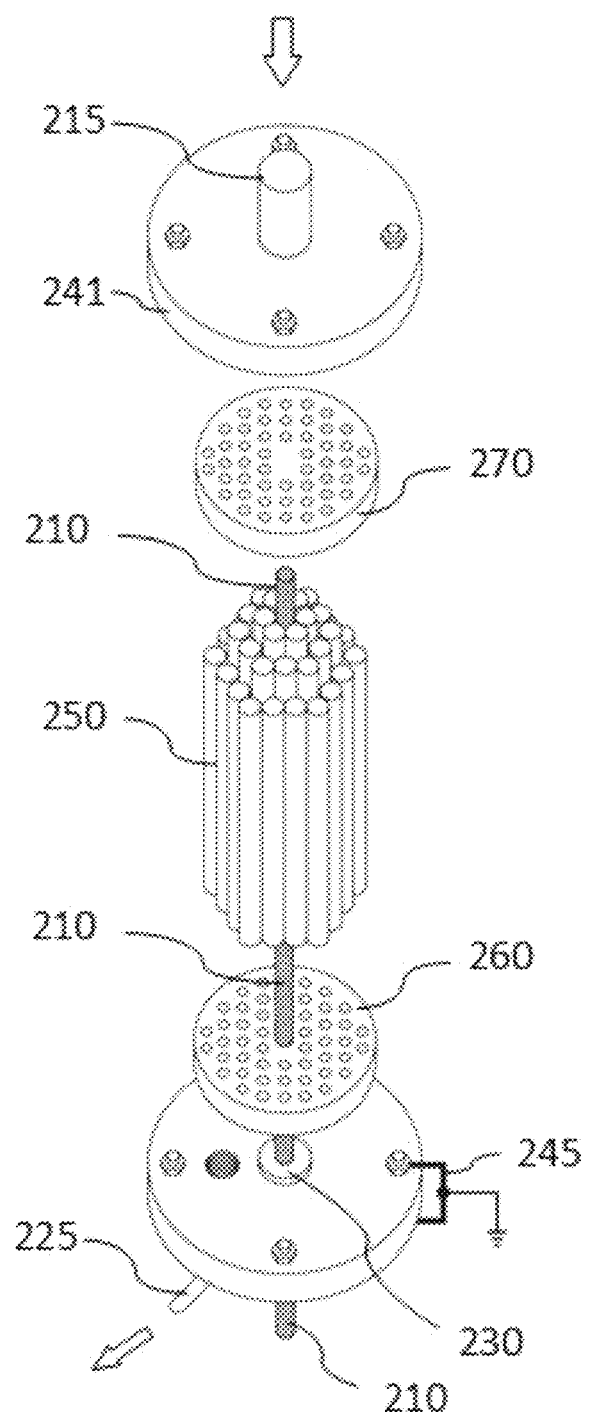
FIG. 2C is an elevation cut-away view of the separator, according to an embodiment of the present invention.
Figure 3:
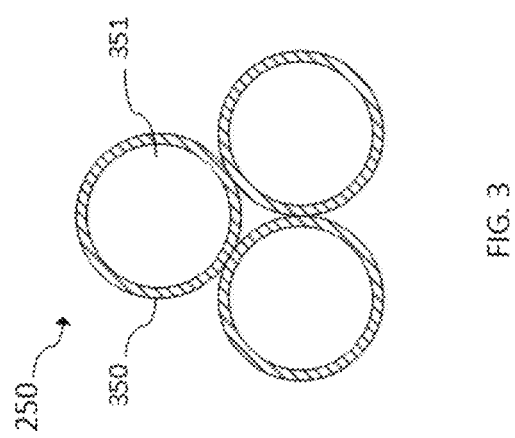
FIG. 3 is an elevation cut-away view of the hard-anodized metal rods, according to an embodiment of the present invention.

Preferred embodiments of the present invention and their advantages may be understood by referring to FIGS. 1-3, wherein like reference numerals refer to like elements.

Referring to FIG. 1, a typical dielectrophoresis ("DEP") filtration system 100 according to the present invention includes a DEP separator 110 vessel, supply reservoirs 120 and 140, collection reservoirs 130 and 150, a pressurized gas or air vessel 160, a pre-filter 170, and one or more pumps, such as primary pump 125 and cleaning pump 135, high voltage power supply 145, pipes 112 and 122 and valves 146. Supply reservoir 120 is connected to pre-filter by a supply pipe 122. Pre-filter 170 is connected to separator 110 by an inlet pipe 112, and clarified liquid collection reservoir 130 is connected to the separator by outlet pipe 132, respectively.

Primary pump 125 delivers the high particle concentration liquid from reservoir 120 to DEP separator 110 through pipe 112 & 122, and pre-filter 170. Cleaning pump 135 drives the cleaning liquid from reservoir 140 separately through pipe 162 and valve 180 into separator 110. The valve 180 selects whether the high particle concentration liquid is pumped into the separator 110 (particle separation mode) or the cleaning system provides the fluid (in cleaning mode). A wash reservoir 150 is connected to separator 110 to collect the used cleaning liquid with high concentration particles after the cleaning process. A high voltage power supply 168 is connected to separator 110 by a high voltage cable 166 and powers a high-voltage electrode within the separator 110. DEP filtration system 100 could also include a pressurized gas/air vessel 160, that supply the pressurized gas or air to assist separator 110 cleaning. Valve 180 switches or shuts off the cleaning liquid or air from reservoir.

In industrial applications, such as crude oil refineries, there are two major process cycles to operate the filtration systems: particle separation and cleaning. During particle separation, pump 125 delivers liquid (for example, high-particle slurry oil) from supply reservoir 120 to separator 110 through supply pipe 122, and pre-filter 170, which filters large particles out of the liquid before the liquid enters the DEP system 100, and supply pipe 112. Once the fluid is in the separator 110, in order to separate particles from the fluid, the high voltage power supply 160 applies a high voltage to a central electrode within the DEP separator 110. DEP separator 110 traps and collects the particles from the fluid by means of dielectrophoresis, and retains particles within the DEP system 100. The filtered fluid exits separator 110 through pipe 132 and collects in a clarified liquid reservoir 130. The electrode and separator structures are described in further detail below. The applied voltage generates a gradient electric field between the central electrode and the cylindrical shell. Furthermore, the insulated metal rods between the central electrode and shell creates many localized strong gradient channels in the electric field between the rods to effectively increase DEP forces on the particles. Depending on the dielectric properties of the particles and the fluid, the gradient electric field causes particles to be trapped in the channels. Although FIG. 1 illustrates liquid reservoir 120 being positioned higher than DEP separator 110 and collection reservoir 130 and liquid flows downward, in preferred industrial embodiments, the liquid in the supply reservoir 110 are mostly pumped in from low part or bottom of DEP separator 110 so that the fluid is pumped upwards, against the gravitational force. This can reduce sedimentation of particles in the system and increase DEP separator 110 treatment capacity.

During system cleaning operation, the high voltage previously applied to separator 110 is turned off, and pipe 112 and pipe 132 connected separately to reservoir 120 and 130 are shut off as well. Without the high voltage, the gradient field is turned off and the particles are no longer retained by DEP force against the electrode and rods. Pressurized liquid may be pumped from the supply reservoir 140 by pump 180 flushes the trapped particles inside separator 110 with the high-pressure liquid to the collection reservoir 150. Once the cleaning operation is completed, pump 180 is turned off and both pipe 152 and pipe 152 are shut off. In addition, or alternatively to save cleaning fluid, DEP separator 110 can be flushed with high pressurized gas from gas vessel 160. The pressurized flush liquid washes the particles out into the collection reservoir. Once the cleaning or flush cycle is complete, the DEP system is ready to clean more filtered fluid in the particle separation cycle.

It is valuable and necessary to determine appropriate interval durations of separation and cleaning cycles to maximize the benefits from DEP separator. In general, there are two methods to find out the appropriate periods of the separation and clean cycles: A static or fixed duration for operating separation cycles and cleaning cycles; and dynamic feedback control on the separation and cleaning cycles. Once the particle concentration in the liquid is steady or varying within a predetermined range, the static method may be employed by operating the separation cycle repeatedly in a constant period. In an embodiment, the separation period interval Ts can be simply estimated by the channel capacity W of separator 110, fluid rate f, and the particle concentration λ:

$$Ts=W\cong(f\times\lambda)$$

In general, the cleaning period Tc is short and pre-defined due to high voltage off and channel surface smoothness. The operation cycle period combines both Ts and Tc. The other method is a dynamic method wherein a feedback loop is used to determine the amount of pressure required or oil throughput, wherein a substantial reduction in either results in an automated cleaning cycle. The dynamic method is more directed towards industrial automated application of the system. In industrial environments, automated operation procedures are programmed to alternate between separations and cleaning operations.

Compared with a mechanical filter, the DEP separator has advantages to filter fine particles below 10 μm. To maximize the usage of DEP separator 110, a pre-filter 170 is implemented to filter undesirably large particles from entering DEP separator 110 they would disproportionately block channels and prevent efficiency for separation of smaller particles. In some embodiments, the pre-filter 170 is a metal strainer or duplex strainer that passes particles of less than a certain threshold size, such like 75 um. The threshold size may be the maximum anticipated size of the target particle, and the pre-filter 170 would also naturally remove larger, non-target particles from the fluid prior to enter DEP separator 110. In some embodiments, the threshold particle size of pre-filter 170 can be based on the physical channel characteristics of separator 110, such as the maximum particle size that can easily clog separator 110. This can prevent the DEP separator 110 from becoming clogged. In some industrial embodiments, if significant portion of the particles in liquid is present, a pre-filter backwash cycle is necessary to prevent the pre-filter from becoming clogged.

Referring to FIG. 2A, FIG. 2B, and FIG. 2C, the DEP separator 110 comprises an outer vessel and an inner high-voltage electrode, wherein the electrode 210 and metallic vessel 240 as two opposite polarities to create an electric field therebetween. In an embodiment, the vessel 240 is cylindrical. Furthermore, a plurality of insulated metal rods 250 surround the central electrode, densely packed layer by layer, to fill up the cylindrical space between the central rod and the cylindrical shell. Standard mechanical flanges 241 and 242 (i.e. ASME) with the cylindrical shell form the pressurized vessel or chamber to allow DEP separator 110 to be applied to high pressure and high temperature applications that are common processing environments among petrochemical plants or refineries. High voltage feedthrough 230 on flange 242 is applied to the high voltage central electrode 210 from the ground potential carried by the vessel 240 and flange 242. A ground wire strip 245 connects vessel 240 and 241 to a well-defined ground reference, i.e. electrical ground from outlet or building ground. An inlet pipe 215 is wielded on the surface of flange 241, while an outlet pipe 225 is mounted on the other flange 242. Once the incoming fluid passes through inlet 215, fluidic flow is regulated and distributed by an inlet manifold 270 to run through DEP channels 255 evenly. At the other end, an outlet manifold 220 is implemented to collect the filtered fluid and also provide the needed electrical insulation for the insulated metal rods from the metal flange 242.

One of key applications of the invention is the filtration of heavy oil streams in crude oil refineries, so both inlet manifold 270 and outlet manifold 260 are made of high temperature insulating materials like ceramic, or PTFE (Teflon®). Depending on the diameters of the insulated metal rods 250 and cylindrical shell 240 and packing styles, DEP separation channels have a unique pattern, and the opening ports on the inlet and outlet manifolds mirror the pattern. The pattern alignment between DEP separation channels and inlet manifold 270 or outlet manifold 260 is beneficial for the effectiveness and efficiency of cleansing the DEP separator with cleansing fluid, particularly where pressurized gas or air is additionally used to clean the particles trapped in DEP channels. In an embodiment, the inlet manifold and outlet manifold comprise plates with uniform perforations so as to distribute the particle-dense oil across the channels. 255.

During the separation cycle, fluid pumped from supply reservoir 120 enters the cylindrical vessel through pipe 215 matingly engaged with the flange 241. The fluid flows through, and is distributed by, inlet manifold 270. The fluid flows parallel along the insulated metal rods, through channels 255. A power supply 160 provides high voltage to energize the central electrode 210. Between the central electrode 210 and cylindrical shell 240, a gradient electric field is created that is perpendicular to the central electrode. By filling up the space inside the cylindrical shell with insulated metal rods, localized and stronger electric field gradients are created within the plurality of small channels 255 between rods. While flowing through DEP separation channels 255 along the insulated metal rod, particles in the fluid experience stronger DEP separation forces and are attracted to points of contact between the rods. Particles achieve a drifting velocity dependent on their size, and the fluid viscosity, and move to the points of contact between the insulated metal rods, where localized maximum or minimum electric fields are created.

In some embodiments, fluid pumped from the supply reservoir 120 enters cylindrical vessel through pipe 225 on the bottom flange 242 and through manifold ports 260. The incoming fluid from the bottom pipe 225 has less gravitational force to overcome for DEP separation efficiencies.

During the cleaning cycle, high voltage on the central electrode 210 is turned off, removing the attractive force between the particles and the intersection points between rods 250. The cleaning fluid in reservoir 140 is pumped through inlet pipe 215 into separator chamber 240. Inlet manifold 270 distributes the incoming pressurized fluid evenly to each separation channel formed by the insulated metal rod 250. The trapped particles in DEP separator channels 255 are easily washed out since the trapping forces, DEP forces and polarized particles' attractive forces, are removed due to the powering off of the central electrode. At the beginning of the cleaning cycle, the cleaning fluid flows out the outlet manifold with high concentration of the trapped particles, (in some embodiments up to 20%). After a short interval, the cleaning fluid becomes clarified again, since the particles have already been removed, and the cleaning cycle of DEP separator 110 is completed. The interval of the cleaning cycle can be measured by testing the particle concentration during the wash cycle.

In industrial applications, it is economical to use as little fluid as possible to accomplish effective cleaning during the cleaning cycle. One optimization strategy is to extend the separation cycle as long as possible without degrading the separation efficiency down to a threshold i.e. 95%. The duration of the separation cycle is specific for the application ad takes into account separation efficiency requirements, the metal rod size, and channel length, etc. Another optimization strategy is to adopt pressurized air or gas to assist channel cleaning, especially for smaller channels. For air- or gas-assisted cleaning, maintaining a vacuum at the outlet end with a vacuum pump increases the cleaning by increasing the air speed inside separation channels.

In an embodiment, during the cleaning process, the high-pressure air or gas is applied from the drain end of the vessel, and may be pressurized to provide airflow at supersonic speeds through the holes between the rods. As there is no power supplied to the electrode at the time of the backwash cycle, there is no DEP force retaining the catalyst. The adherence of the residual oil to the rods is the only force that must be overcome. In another embodiment, the high-pressure air or gas is applied at the ingress end of the vessel, in the same direction as separation normally takes place.

Referring to FIG. 3, in the present embodiment, hard-anodized aluminum rods 250 are adapted for use as the insulated metal rods. A hard-anodized aluminum layer 350 insulates the metal rods 351. In general, hard-anodized aluminum surfaces have about 50 µm thickness insulation layer made of Alumina ($Al_2O_3$). For industrial applications like heavy oil catalyst filtration in crude oil refineries, where long-term operation or lifetime of the insulation layer is required, the hard-anodized 50 um layer on the aluminum rod is too thin to withstand the abrasive high temperature heavy oil with high-level catalyst concentration. In preferred embodiments for industrial applications, high temperature insulation materials, like Teflon® or ceramic are coated on the metal rods surface. In general, ceramic coating has better performance on the abrasion resistance and higher operation temperature over Telfon® types of high temperature plastic, however the cost of the ceramic coating are higher. Some trade-offs are needed in achieving practical industrial embodiments.

Another embodiment of the invention includes electrically insulated metal rods with round-shape cross-section of uniform diameter instead of anodized rods 250. Other cross-sectional shapes may be used to vary the surface area and field strength and characteristics, such as triangular, square, pentagonal and hexagonal.

In yet another embodiment of the invention, the electrically insulated metal rods with a circular cross-section have varying diameters, and are positioned interstitially in order to minimize the gap of rods. The vessel 240 is filled with the rod bundle as much as possible, so as to maximize the points of high electric field. Rods thickness may be determined empirically: when the rods are too thin, they become flexible, and when too thick, the channels are too large to provide effective separation.

The filtration capability of filtration system 100 is dependent on the processing volume of DEP separator 110 and the processing time of the fluid liquid flowing through the separator 110. The processing time can be controlled by the flow rate of the fluid passing through the separator 110. In the present embodiment, DEP separator 110 has a volume of about 1320 milliliters and the system 100 can filter fluid about 900 milliliters. The flow rate can be controlled in the range from 10 ml/min to 500 ml/min. Then the processing time is between 1.8 minutes to 90 minutes. However, in other embodiments, the system 100 can be adapted to filter industrial volumes based on the industrial capabilities and furthermore, the filtration capability can be vary as desired.

Parameters governing these characteristics of separator 110 are discussed in detail below. Although the pre-filter 170 in system 100 is shown as a separate unit, in other embodiments the pre-filter can be included in as a component within separator 110. Alternatively, pre-filtering can be performed in a system separate from system 100, or not at all. Examples of filters include silicon and ceramic filters with pore sizes designed to exclude undesirable particles. Silicon and ceramic filters may be advantageous because cross-flow across the surface of the filter can be used to remove the undesirable particles, pore sizes may be uniform and/or high pore densities can be achieved (providing the possibility of high flow rates).

The plates of inlet port 270 and outlet port 260 are the same size and shape. In general, the size and shape of inlet and/or outlet ports may vary as desired to fit in the vessel for rods aligning and oil distribution. Moreover, the combination of fluidic channels and/or inlet and/or outlet ports can be engineered to provide the desired fluidic flow through the device. In the present embodiment, to give dimensional examples, the inlet plate has a diameter of 52.1 mm and is composed of an aluminum plate with 6.35 mm thickness. The 3 mm holes were drilled on the plate based on the pattern of hexagonal array of rods for oil flowing into the channels, which are formed by an anodized aluminum pipe and bundled rods. This prevents the rods from passing through the holes. The anodized aluminum pipe may be 52.3 mm in regards to the inner diameter. The outlet plate is a diameter 52.1 mm PTFE disk with 6.35 mm thickness. In an embodiment, 3 mm holes were drilled on the plate based on the pattern of hexagonal array of rods to allow the oil through the rods to drain out. The PTFE plate has a thin wall to hold the rods on place. The inlet and outlet plates are lined up with the rods, so the oil can pass through the fluidic channels and the rods absorb the particles on their surfaces.

In another embodiment of the invention, and with reference to FIG. 2C, the plurality of electrically insulated rods are assembled in the form of concentric hexagons around first the high-voltage electrode, to reduce the spacing between the insulated rods and increase the electric field $E_{max}$ points around the circumference of the rods. In a preferred embodiment, to reduce the spaces between rods, the high-voltage electrode is surrounded by a hexagonal shape formed by 6 anodized aluminum rods with a similar diameter than the electrode. These 6 rods forming the innermost hexagon are surrounded by a hexagonal shape formed by 12 electrodes, and the 12 are surrounded by a bundle of 18 rods in a third concentric hexagon.

In use, the oil passes through the vessel 240 within the gaps in the rods 250. The high-voltage electrode 210 is charged and provides a field between the high-voltage electrode and the grounded vessel wall 240. Each of the rods within the field is charged by the field to provide a dipole across its width. As the slurry oil containing typically 0.5-1.0% catalyst passes the charged rods, the catalysts are attracted to the rods and are retained there. The catalyst retained by the rods builds up and blocks the oil flow, and is then removed by a cleaning cycle.

Other objects, aspects, features and advantages of the invention will appear from the following description in which the preferred embodiments have been set forth in detail, in conjunction with the accompanying drawings and also from the following claim.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

The invention claimed is:

1. A dielectrophoretic separator comprising:
   a. a separator vessel having a fluid ingress at a first side and a fluid egress at a second side;
   b. an electrode electrically connected to a power source and contained within the vessel, along the central axis;
   c. a plurality of high permittivity dielectric rods, each rod having a metal cross-section, within the vessel positioned around and parallel to the electrode,
   wherein the electrode has a first polarity and the vessel has a second polarity such that an electromagnetic field is generated between the electrode and the vessel.

2. The dielectrophoretic separator of claim 1 wherein the vessel is cylindrical with the ingress and egress at opposite ends.

3. The dielectrophoretic separator of claim 1 wherein the high permittivity dielectric rods are either with or without electrical connection to the power sources with the defined electrical potentials.

4. The dielectrophoretic separator of claim 1 wherein the metal cross-section is anodized aluminum.

5. The dielectrophoretic separator of claim 1, wherein the rods are coated with an insulation material, selected from the group consisting of PTFE plastic and ceramic.

6. The dielectrophoretic separator of claim 5 wherein the high permittivity dielectric rods form a concentric pattern around the electrode configured to minimize the hollow space among rods.

7. The dielectrophoretic separator of claim 6 wherein the concentric pattern is a hexagonal style.

8. The dielectrophoretic separator of claim 1 further comprising an inlet manifold disk between the fluid ingress and the rods, and an outlet manifold disk between the rods and the fluid egress.

9. The dielectrophoretic separator of claim 8 wherein the inlet manifold disk and outlet manifold disk are made from a material selected from the group consisting of ceramic and PTFE.

10. The dielectrophoretic separator of claim 1 further comprising a pre-filter on the fluid ingress to filter particles before fluid enters the vessel.

11. The dielectrophoretic separator of claim 1 wherein the plurality of high permittivity dielectric rods are electrically connected to a power source.

12. A method of using a fluid separator, according to a separation cycle comprising the steps of:
   a. powering up an electrode within a vessel such that the electrode and vessel have an opposite polarity and an electromagnetic field is generated, wherein a plurality of high permittivity dielectric rods, each rod having a metal cross-section, are contained within the vessel and are positioned around the electrode, defining a plurality of channels;
   b. the fluid having solid particles therein entering the vessel at an ingress end in a separation direction and passing through the channels;
   c. the solid particles within the fluid being retained against the rods by the energized electrical fields; and
   d. the clarified fluid exiting the vessel at an egress end.

13. The method of claim 12, wherein the solid particles are retained against points of contact between the rods.

14. The method of claim 12, wherein the particles are retained against points of contact between the rods, and wherein the high permittivity dielectric rods are either with or without electrical connection to power sources with defined electrical potentials.

15. The method of claim 12, wherein the metal cross-section is anodized aluminum.

16. The method of claim 12 wherein the high permittivity dielectric rods are coated with insulation materials selected from the group consisting of PTFE plastic and ceramic.

17. The method of claim 16, further comprising the step of pushing pressurized gas through the vessel to push out the cleaning fluid.

18. The method of claim 12 further comprising a cleaning cycle comprising the steps of:
   a. powering down the electrode within the vessel to cease generation of the electromagnetic field;
   b. entering a cleaning fluid into the vessel; and
   c. passing a cleaning fluid through the channels and pushing the particles out of the channels, wherein the particles are no longer retained against the rods.

19. The method of claim 12 wherein the high permittivity dielectric rods are coated with insulation materials selected from the group consisting of PTFE plastic and ceramic.

* * * * *